US 6,885,879 B1

(12) United States Patent
Got et al.

(10) Patent No.: US 6,885,879 B1
(45) Date of Patent: Apr. 26, 2005

(54) BATTERY RECONNECT SYSTEM FOR A TELECOMMUNICATIONS POWER SYSTEM

(75) Inventors: Pierre Got, Montreal (CA); Christian de Varennes, Montreal (CA); Louis Duguay, Dollard-des-Ormeaux (CA)

(73) Assignee: Astec International Limited, Kowloon (HK)

( * ) Notice: Subject to any disclaimer, the term of this patent is extended or adjusted under 35 U.S.C. 154(b) by 672 days.

(21) Appl. No.: 09/587,095

(22) Filed: Jun. 2, 2000

(51) Int. Cl.$^7$ .............................. H02J 7/00; H02J 9/00
(52) U.S. Cl. ........................ 455/572; 307/85; 307/86
(58) Field of Search .............................. 455/572–574, 455/343.5, 343.6; 379/318, 322, 331, 324; 307/18, 31, 46–48, 64, 85–87, 66; 320/123

(56) References Cited

U.S. PATENT DOCUMENTS

| | | | | |
|---|---|---|---|---|
| 5,332,927 A | * | 7/1994 | Paul | 307/66 |
| 5,642,100 A | * | 6/1997 | Farmer | 340/636 |
| 5,969,436 A | * | 10/1999 | Chalasani et al. | 307/64 |
| 5,982,598 A | * | 11/1999 | Kakalec et al. | 361/111 |
| 5,990,575 A | * | 11/1999 | Flaugher | 307/23 |
| 5,999,389 A | * | 12/1999 | Luebke | 361/68 |
| 6,037,747 A | * | 3/2000 | Chalasani | 320/125 |
| 6,204,573 B1 | * | 3/2001 | Green | 307/66 |
| 6,278,200 B1 | * | 8/2001 | Daniel et al. | 307/31 |
| 6,281,602 B1 | * | 8/2001 | Got et al. | 307/66 |
| 6,297,972 B1 | * | 10/2001 | Chen | 363/37 |
| 6,541,954 B1 | * | 4/2003 | Gluszek | 324/107 |
| 6,650,967 B1 | * | 11/2003 | Got et al. | 700/286 |

* cited by examiner

Primary Examiner—William Trost
Assistant Examiner—Brandon J. Miller
(74) Attorney, Agent, or Firm—Harness, Dickey & Pierce, P.L..C.

(57) ABSTRACT

A telecommunications power system includes a power bus and a battery module with a plurality of batteries. A contactor connects the batteries to the power bus. A distribution module and a plurality of rectifier modules are connected to the power bus. A plurality of loads are connected by the distribution module to the power bus. A controller disconnects the batteries using the contactor when a voltage of the batteries falls below a low voltage disconnect threshold when AC power is lost and/or the rectifier modules fail. The controller minimizes current surge and high voltage transients when the rectifier modules begin providing power and the contactor closes to reconnect the batteries to the power bus. To minimize current surge and high voltage transients, the controller lowers a voltage of the rectifier modules to the voltage of the batteries before the contactor reconnects the batteries to the power bus. After reconnection, the controller gradually increases the voltage of the rectifier modules to the float voltage. The controller employs a serial communications protocol over a communications bus.

20 Claims, 6 Drawing Sheets

BATTERY RECONNECT SYSTEM FOR A TELECOMMUNICATIONS POWER SYSTEM

TECHNICAL FIELD OF THE INVENTION

This invention relates to telecommunications power systems. More particularly, this invention relates to the reconnection of backup batteries to the telecommunications power system after the backup batteries are disconnected to prevent excessive battery discharge.

BACKGROUND AND SUMMARY OF THE INVENTION

Telecommunications power systems generally employ rectifiers that generate a direct current (DC) voltage from an alternating current (AC) power source. Distribution modules include circuit breakers that connect the rectifiers to loads and that distribute current to the loads. The loads in a telecommunications power system typically include telephone switches, cellular equipment, routers and other associated equipment. In the event that AC power is lost, the telecommunications power systems generally rely on backup batteries to provide power and to prevent costly down time. Telephone switches, cellular equipment and routers normally carry thousands of calls and/or data streams that will be interrupted if power is lost causing a significant loss of revenue.

The backup batteries provide power for a predetermined backup period which varies depending on the number and size of the loads. The backup batteries should provide a sufficient time to allow skilled technicians to troubleshoot and to fix the problem or to connect a backup generator. Sometimes, however, the technicians are unable to solve the problem quickly and/or backup generators are not readily available. If the backup batteries continue to provide power beyond the predetermined backup period, the backup batteries discharge excessively which will shorten the useful life of the backup batteries. Since backup batteries often constitute approximately 50% of the cost of the telecommunications power system, operators often disconnect the backup batteries and accept the loss of service to prevent damage to the backup batteries.

During normal operation, the rectifiers operate at a float voltage of the backup batteries. When the rectifiers operate at the float voltage, the backup batteries provide little or no power and remain in a charged state. When the AC power is lost or the rectifiers fail, the output voltage of the rectifiers decreases below the float voltage and the batteries begin providing power to the loads through the distribution module. As the backup batteries discharge, they reach an output voltage below which damage to the backup batteries generally occurs.

To prevent damage to the backup batteries, operators generally disconnect the batteries in one of two ways. A contactor disconnects either the loads or the backup batteries. Since the contactor is a single point of failure, customers increasingly request battery disconnection rather than load disconnection. When the former method is employed, the telecommunications power system remains operational if the contactor fails during normal operation. When the latter method is employed, service is lost if the contactor fails during normal operation.

Once AC power returns after a failure that results in the backup batteries being disconnected due to excessive discharge, the rectifiers begin providing power to the loads. If the backup batteries are reconnected by closing the contactor, sharp voltage transients and high in-rush current occurs which may damage the batteries and the contactor and disrupt the operation of the loads.

The battery reconnect system according to the present invention eliminates the problems that may occur when batteries are reconnected in a telecommunications power system. The battery reconnect system senses whether the contactor is open. If the contactor is open and if the rectifier voltage is higher than a reconnect threshold, a reconnect procedure begins. The rectifier voltage is gradually decreased until the rectifier voltage approximately equals the disconnected battery voltage. The battery reconnect system closes the contactor. Subsequently, the reconnect system gradually increases the voltage of the rectifier to the float voltage while controlling current in a current limiting mode such that the batteries are optimally recharged.

As can be appreciated, the reconnect system according to the invention provides a very reliable solution for reconnecting backup batteries to the telecommunications power system after AC power is lost and the backup batteries are disconnected to prevent low voltage discharge. The need for intervention by a highly skilled technician is eliminated. The reconnect system reduces the cost of operation and increases up time of the telecommunications power system.

DETAILED DESCRIPTION OF THE PREFERRED EMBODIMENTS

Figure 1:
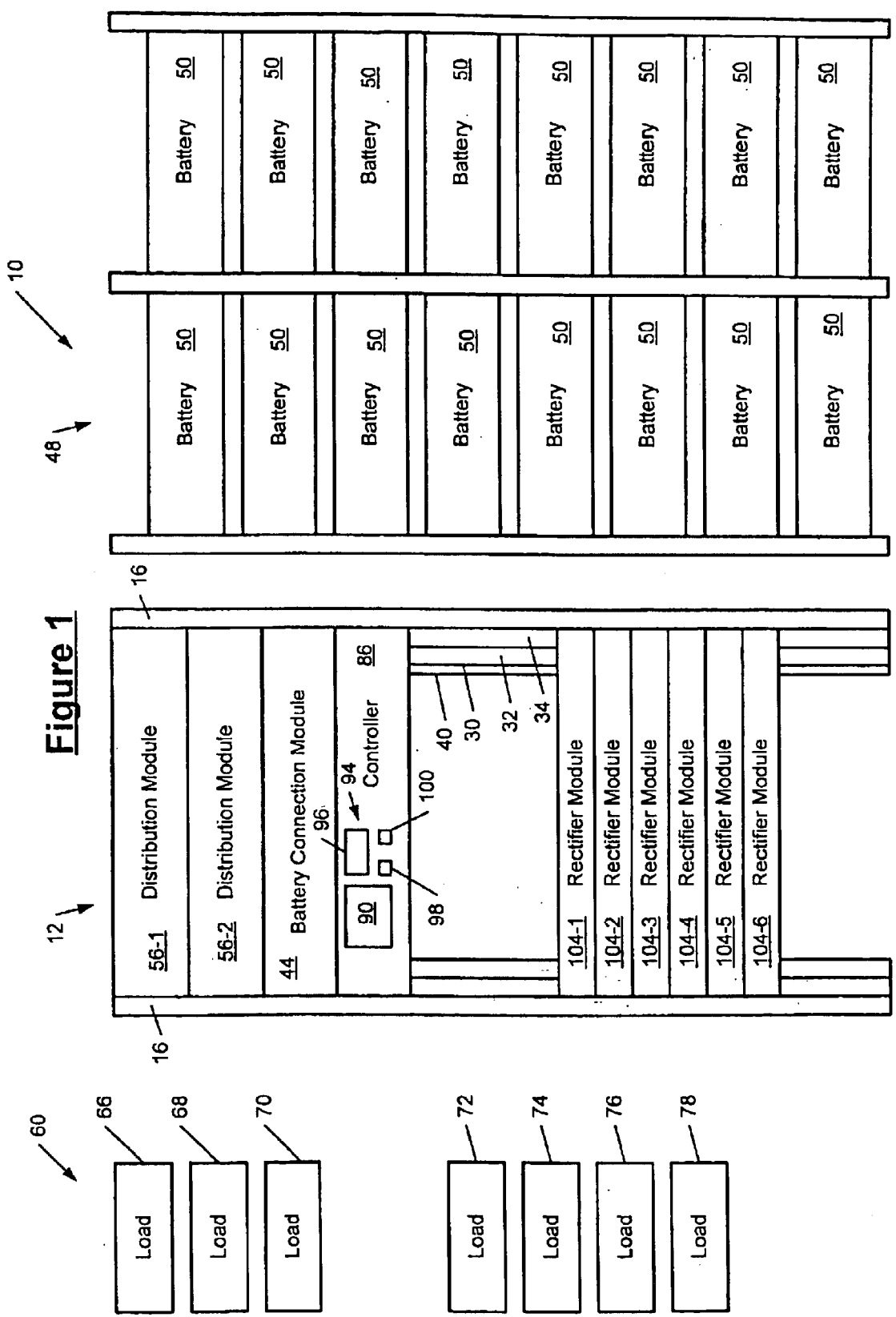
FIG. 1 is a block diagram of a telecommunications power system that includes a frame that is connected to a plurality of loads and a battery pallet with a plurality of batteries according to the invention.

Referring now to FIG. 1, a telecommunications power system 10 is illustrated and includes one or more frames 12, each including a rack 16. A direct current (DC) bus 30 includes first and second conductors 32 and 34 that extend along the rack 16 in a vertical direction and that are separated by an insulating layer (not shown). A communications bus 40 is located adjacent to the DC bus 30 and likewise includes a layer (not shown) that insulates the communications bus 40 from the first and second conductors 32 and 34.

The design of the telecommunications power system 10 is modular such that the capacity of the telecommunications power system 10 can be changed by adding or removing modules from the telecommunications power system 10. The design of the telecommunications power system 10 has been optimized through the use of modular connectors (not shown) to facilitate the connection and disconnection of the modules from the frame 12.

The telecommunications power system 10 includes one or more battery connection modules 44 that are connected to the DC bus 30 and the communications bus 40. The battery connection module 44 is connected to a pallet of backup batteries 48 that includes a plurality of battery cells 50. In a preferred embodiment, each of the battery cells provides a two-volt output and a relatively high current output. The battery cells 50 are typically connected into battery strings that contain from 24 to 26 battery cells. Each battery string provides 48 VDC for telephone switch and router applications. Depending upon the length of time desired for the battery backup and the size of load to be supplied, the size and/or number of batteries may be varied. Skilled artisans can appreciate that other voltages, string sizes and packaging arrangements can be employed if desired.

One or more distribution modules 56 are connected to the DC bus 30 and the communications bus 40. The distribution modules 56 distribute power to one or more loads 60 such as telecommunications switches, cellular equipment and routers. For example in FIG. 1, the distribution module 56-1 delivers power to loads 66, 68 and 70. The distribution module 56-2 delivers power to loads 72, 74, 76, 78. The number of distribution modules depends on the size and number of the loads that are associated with the telecommunications power system 10. Connections between the loads and the backup batteries have been omitted for purposes of clarity.

A master controller 86 is connected to the DC power bus 30 and to the communications bus 40. The master controller 86 includes a display 90 and an input device 94 that preferably includes a touch pad 96 and buttons 98 and 100. The alternative display can be a computer monitor. The input device 94 and the display 90 can be combined in a touch screen display. A keyboard and/or a mouse may also be employed. The master controller 86 preferably provides an internet browser-like interface that is navigated using the touchpad 96 in a conventional point-and-click manner or using the touchpad 96 and the buttons 98 and 100. Alternately, a text-based, menu-driven interface can be employed.

Figure 2:
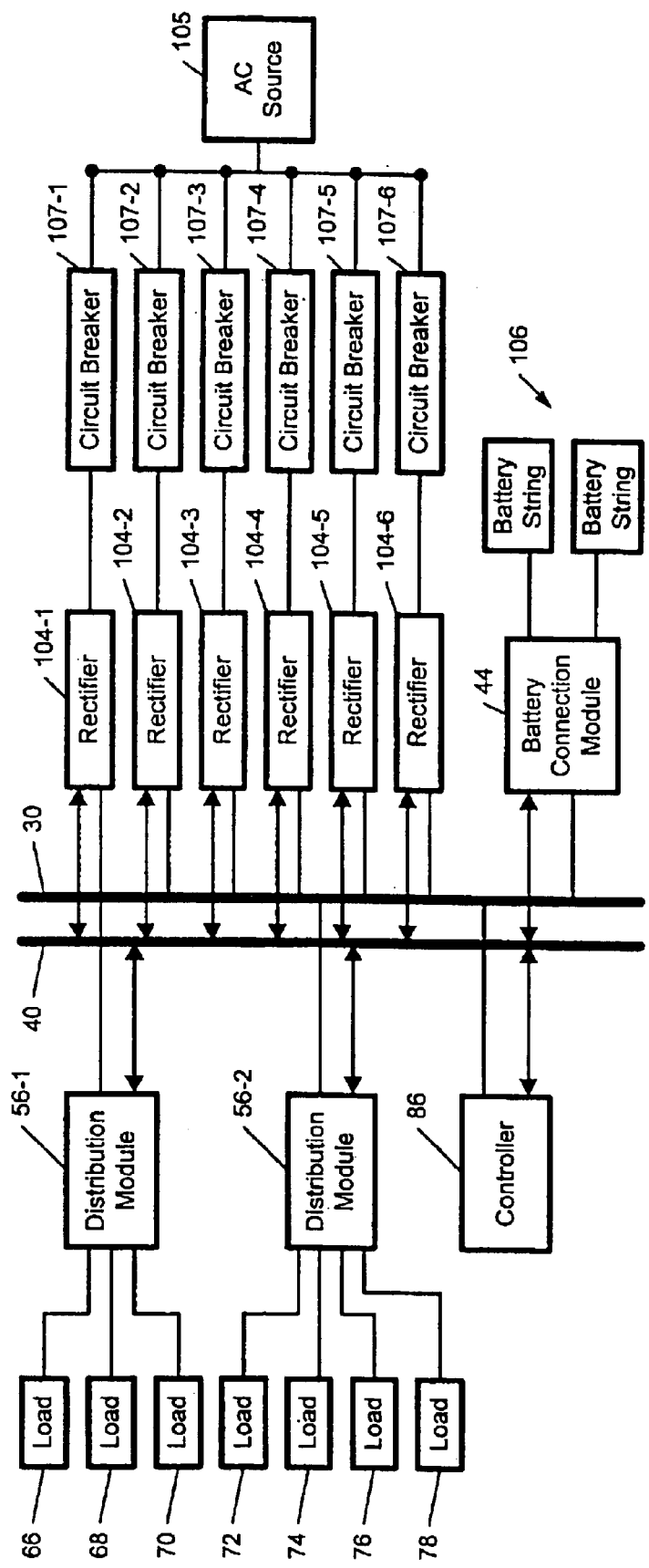
FIG. 2 is a functional block diagram of the telecommunications power system of FIG. 1.

Referring now to FIG. 2, the telecommunications power system 10 further includes one or more rectifier modules 104 that are connected to the DC bus 30 and the communications bus 40. The rectifier modules 104 are connected to an AC power ource 105 such as that provided by utilities or other power generating systems. Preferably, circuit breakers 107 are provided between the AC source 105 and the rectifier modules 104. Alternately, an AC power bus may be employed.

In use, the AC power provided to the telecommunications power system 10 has a voltage that is typically between 80 and 300 VAC at a frequency between 45 and 65 Hz. The rectifier modules 104 rectify the AC voltage. The rectifier modules 104 provide a controllable output voltage and current and are rated at 48 volts nominal and 50 or 200 amps. Skilled artisans can appreciate that other voltages and currents may be provided by the rectifier modules 104 for systems having different current and voltage requirements.

Depending upon the type of backup batteries employed, the output voltage of the rectifier modules 104 will be set higher than 48 volts. Typically, the rectifier modules 104 operate at a float voltage of the backup batteries during normal operation so that the backup batteries do not discharge current. The float voltage is typically between 52 and 54 VDC depending on the battery construction details. The backup batteries are connected as battery strings 106. The rectifier modules 104 preferably include a shunt and an analog to digital (A/D) converter for sensing rectifier voltage and current. The rectifier module 104 transmits digital signals representing the rectifier voltage and current (in addition to other digital control and communications signals) to the controller 86 via the communications bus 40. Preferably, the controller 86 employs a serial communications protocol that is insensitive to noise. In a preferred embodiment, the communications system employs serial communications using a CAN protocol such as CAN version 2.0B.

The distribution modules 56 include one or more circuit breakers (not shown) which are preferably modular plug-in type circuit breakers to facilitate connection and disconnection of the loads 60. The distribution module connects the loads 60 to the power bus 30.

Figure 3:
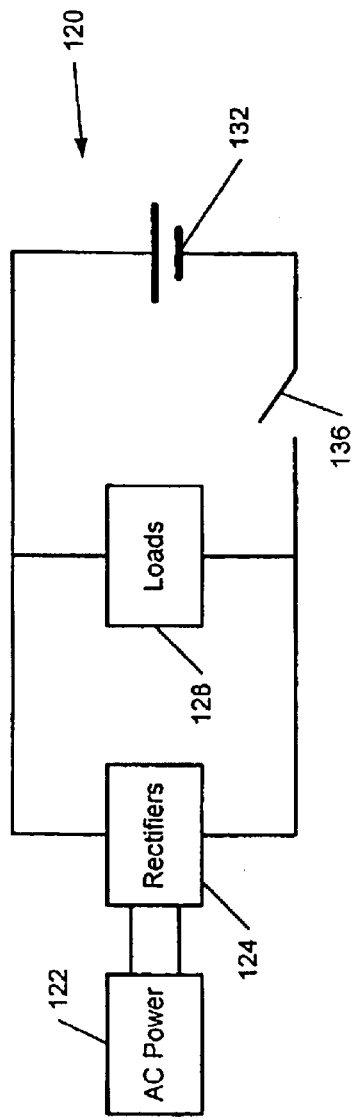
FIG. 3 is a simplified circuit that illustrates rectifiers that are connected to an AC source, loads, a contactor, and a battery.

Referring now to FIG. 3, the operation of the battery reconnect system according to the invention is illustrated by an equivalent circuit that is identified at 120. During use, the AC power source 122 generates an AC voltage that is input (through circuit breakers that are not shown) to the rectifiers 124. The rectifiers 124 generate a DC voltage from the AC voltage. The loads 128 are connected in parallel to the rectifiers 124. During normal operation, the voltage output of the rectifiers 124 is preferably at the float voltage of backup batteries 132 to prevent current discharge. A battery contactor 136 connects and disconnects the backup batteries 132 and is generally closed during operation. When the AC source 122 is interrupted, the output current of the rectifiers decreases to zero. The backup batteries 132 begin discharging and provide power to the loads 128.

To prevent damage to the backup batteries 132, the battery reconnect system according to the invention disconnects the battery contactor 136 when the voltage provided by the backup batteries 132 falls below a low voltage disconnect threshold to prevent damage to the batteries due to excessive discharge. If no other power source is present, the telecommunications power system 10 is in a failure mode—no power is supplied to the loads 128 and service is lost.

When the AC source 122 is re-established, the rectifiers 124 begin increasing output voltage and current provided to the loads 128. The battery contactor, 136 remains in an open state. When the rectifiers 124 reach a reconnection threshold voltage, the reconnect procedure begins. The reconnect procedure decreases the voltage of the rectifiers 124 until the rectifier output voltage equals the backup battery output voltage. Then, the battery reconnect system closes the battery contactor 136.

Since the voltage mismatch between the DC output voltage of rectifiers 124 and the output voltage of the backup batteries is minimized, the battery reconnect procedure reduces or eliminates high transient voltages and in-rush currents that would otherwise occur. The battery reconnect system controls the current in a current limit mode to optimize charging of the backup batteries 132 without damaging the backup batteries. After closing the battery contactor 136, the rectifier voltage is gradually increased. The battery reconnection system completes the reconnection procedure when the backup batteries are charged and the rectifier voltage again reaches the float voltage of the backup batteries.

Figure 4:
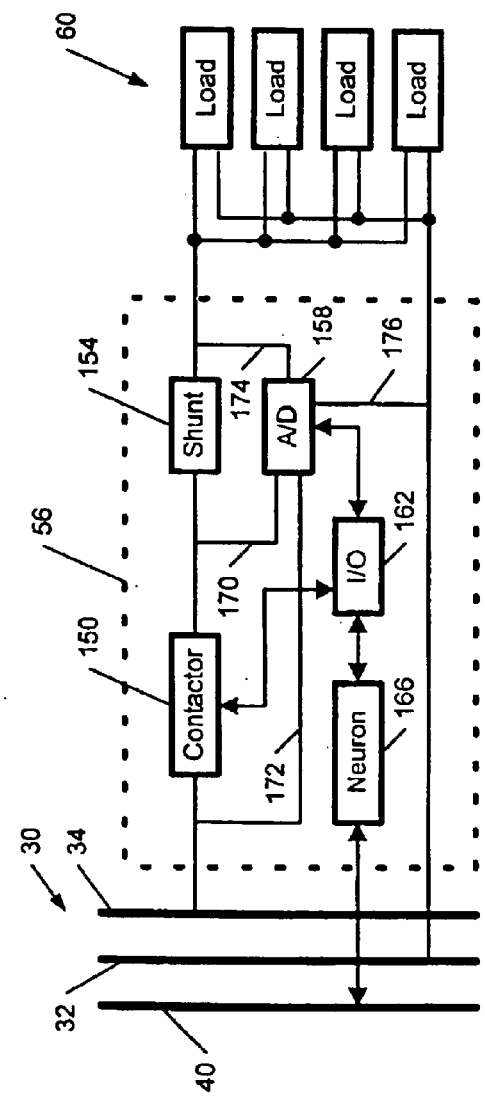
FIG. 4 is a functional block diagram of the distribution module of FIG. 1 in further detail.

Referring now to FIG. 4, the distribution module 56 is illustrated in further detail. The distribution module 56 includes one or more circuit breakers (not shown) that are located between the loads 60 and the DC bus 30. The distribution module 56 includes a contactor 150, a shunt 154, an A/D converter 158, an input/output (I/O) interface 162, and a neuron 166. The contactor 150 is controlled by the neuron 166 through the I/O interface 162. The contactor 150 connects and disconnects the loads 60 and is provided if the telecommunications system operator desires load disconnection. Because contactors are a single point of failure, some system operators opt for battery disconnection instead of load disconnection. When the contactor 150 fails, power to the loads is interrupted. When battery disconnection is used, the load is not interrupted when the contactor fails. Both types of disconnection may be employed if desired.

The neuron 166 is preferably a controller that includes a processor and memory (not shown). The neuron 166 performs local processing for the distribution module 56 and I/O communications between the distribution module 56, the master controller 86, and other modules in the telecommunications power system 10. The I/O module 162 is connected to the neuron 156 and to the A/D converter 158. The A/D converter 158 includes sensing leads 170 and 172 that sense a voltage across the contactor 150. The sensing lead 170 and sensing lead 174 sense a voltage across the shunt 154. The sensing leads 174 and 176 sense a voltage across the loads 60.

Figure 5:
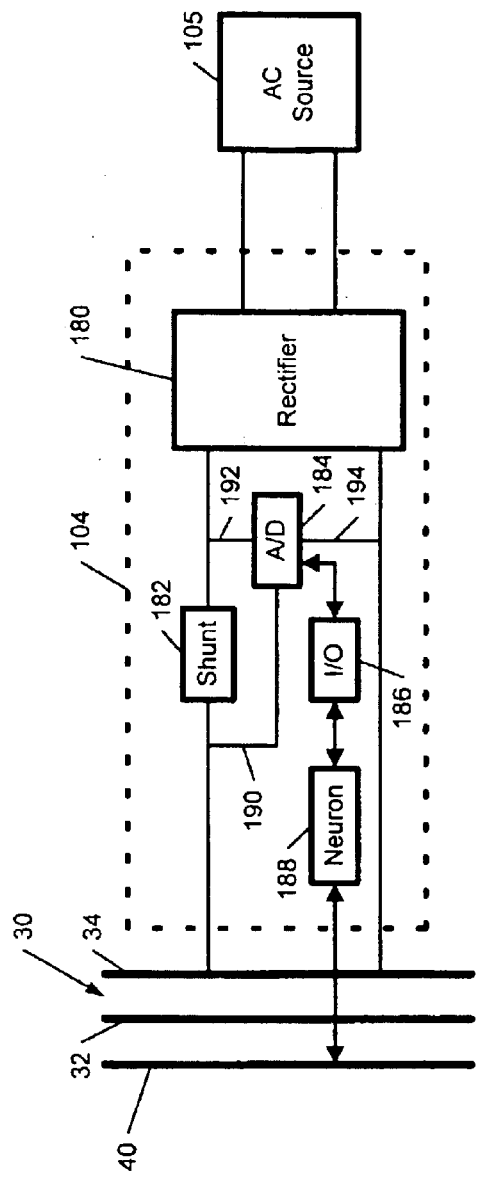
FIG. 5 is a functional block diagram of the rectifier module of FIG. 1 in further detail.

Referring now to FIG. 5, the rectifier modules 104 are illustrated in further detail and include a rectifier 180, a shunt 182, an A/D converter 184, an I/O interface 186, and a neuron 188. The neuron 188 performs local processing functions for the rectifier module 104 and controls I/O communications between the rectifier module 104, the master controller 86 and other modules in the telecommunications power system 10. The A/D converter 184 includes sensing leads 190, 192, and 194. The A/D converter 184 senses the rectifier voltage using the sensing leads 192 and 194 and the rectifier current by sensing voltage across the shunt 182 using leads 190 and 192.

Figure 6:
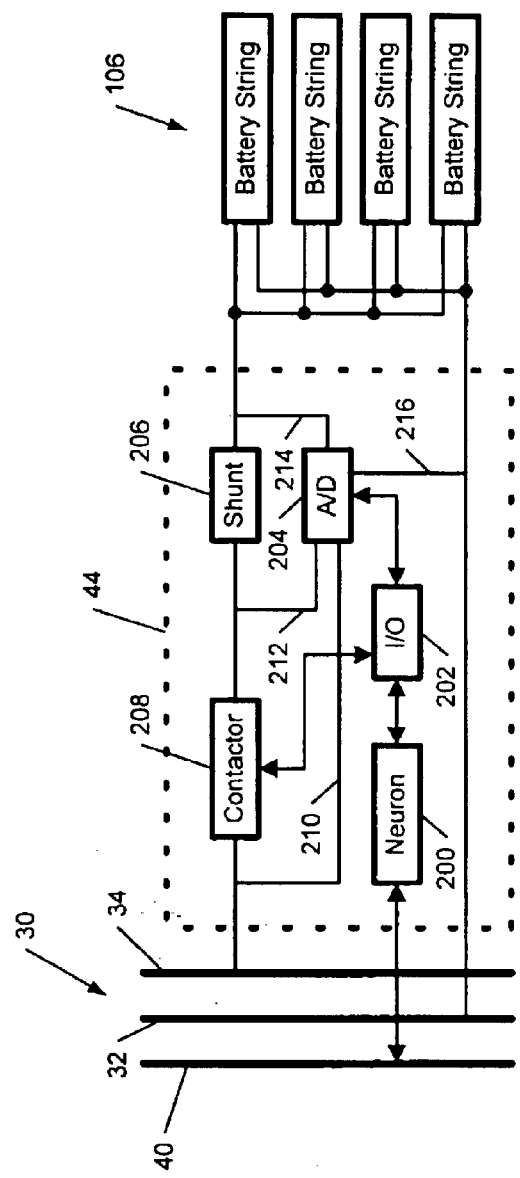
FIG. 6 is a functional block diagram of the battery connection module of FIG. 1 in further detail.
Figure 8A:
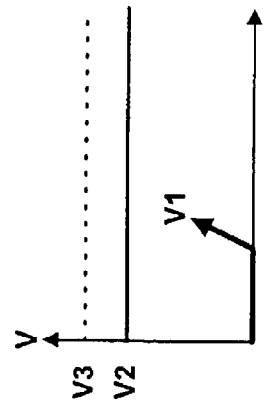
FIG. 8A illustrates an output voltage of a rectifier when AC voltage is restored after the backup batteries are disconnected.
Figure 8B:
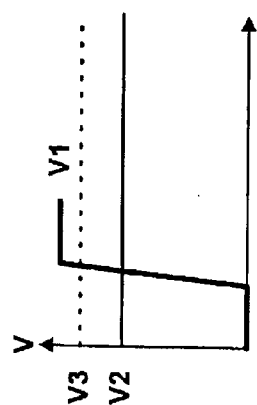
FIG. 8B illustrates the rectifier voltage exceeding a reconnect voltage threshold which initiates the reconnect procedure.
Figure 8C:
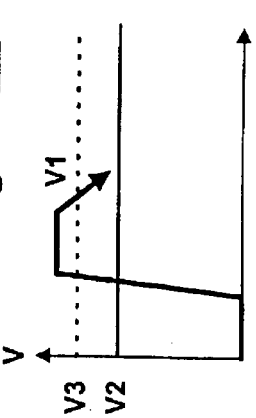
FIG. 8C illustrates the rectifier voltage gradually decreasing to the battery voltage according to the reconnect procedure.
Figure 7:
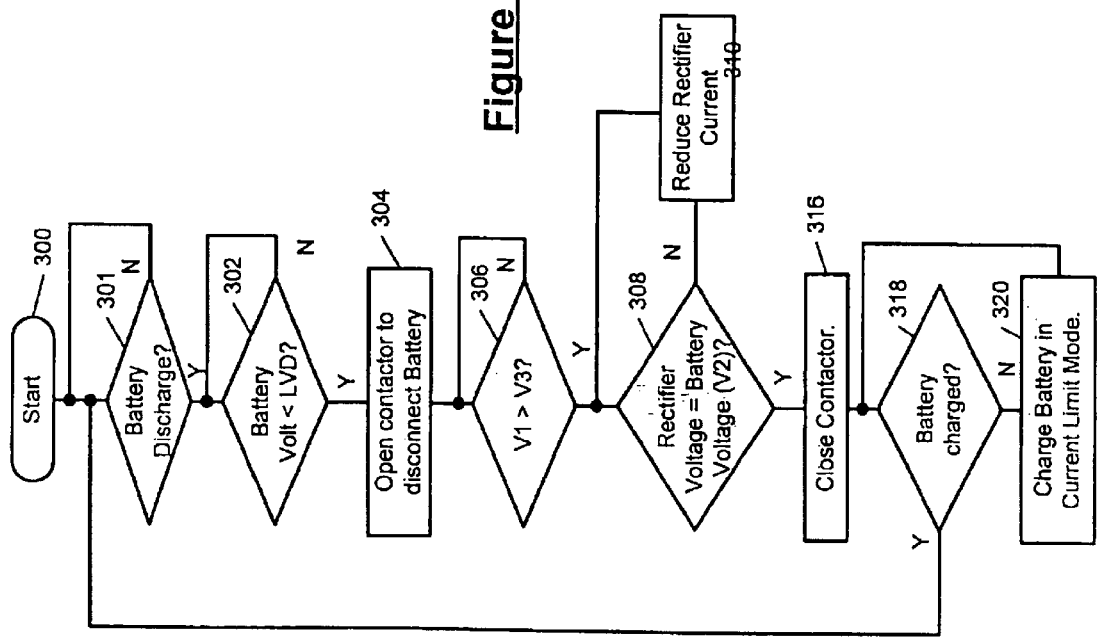
FIG. 7 is a flow chart illustrating steps for reconnecting the backup batteries after AC power is lost and the backup batteries are disconnected to prevent excessive battery discharge.
Figure 8D:
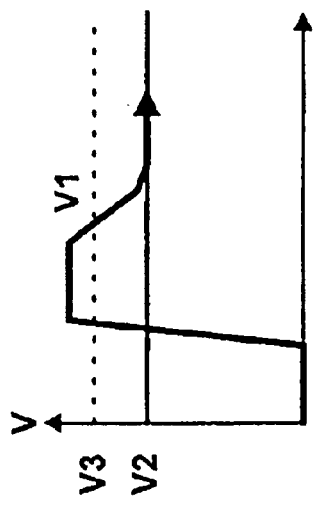
FIG. 8D illustrates the rectifier voltage equal to the battery voltage when the contactor is closed according to the reconnect procedure.
Figure 8E:
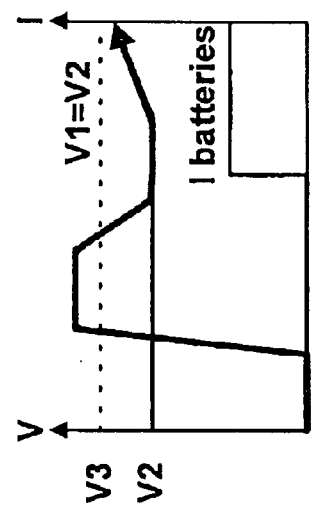
FIG. 8E illustrates the rectifier voltage and battery voltage gradually increasing while current is provided by the rectifiers to the batteries.

Referring now to FIG. 6, the battery connection module 44 is illustrated and includes a neuron 200, an I/O interface 202, an A/D converter 204, a shunt 206 and a contactor 208. The neuron 200 performs local processing functions and I/O communications between the battery connection module 44, the master controller 86 and other modules in the telecommunications power system 10. The contactor 208 is controlled by the neuron 200 through the I/O interface 202. The A/D converter 204 includes sensing leas 210, 212, 214, and 216. The A/D converter 204 senses battery voltage using the leads 214 and 216. The A/D converter 204 senses battery current by sensing a voltage drop across the shunt 206 using the leads 212 and 214. The A/D converter 204 senses the voltage across the contactor 208 using the leads 210 and 212. The voltages of the battery connection module 44 and the rectifier modules 104 can be sensed using the leads 214 and 216 and the leads 192 and 194, respectively. Alternately, the voltage across the contactor 208 can be sensed using the leads 210 and 212. When the voltage across the contactor 208 is approximately zero, the contactor 208 can be closed.

Referring now to FIGS. 7 and 8A–8E, steps for operating the battery reconnect system are illustrated. Control begins at step 300. At step 301, the master controller and/or the neurons determine whether AC power is interrupted and the batteries are discharging. If not, control loops to step 301. Otherwise, control continues with step 302 where the master controller 86 determines if the voltage of the backup batteries is less than a low voltage disconnect threshold. If not, control loops to step 302. Otherwise, control continues with step 304 where the master controller and/or the neuron opens the contactor 208 to disconnect the backup batteries from the telecommunications power system 10.

Later, the AC source returns, the rectifiers begin to provide power (see FIG. 8A) and the rectifier voltage (V1) increases. In step 306, the master controller 86 determines whether the rectifier voltage (V1) is greater than a reconnect voltage threshold (V3) (see FIG. 8B). If not, control loops and continues with step 306. Otherwise, control continues with step 308 where the master controller 86 determines whether the rectifier voltage (V1) equals the battery voltage (V2) within a predetermined tolerance. If not, control continues with step 310 where control reduces the rectifier voltage (see FIG. 8C) and continues with step 308. When the rectifier voltage V1 equals the battery voltage V2, the contactor is closed in step 316 (see FIG. 8D). Control continues with step 318 where the master controller 86 determines whether the battery is charged. If not, control continues with step 320 where control gradually charges the battery by operating in a current limit mode (see FIG. 8E) and allowing rectifier voltage output to gradually increase. Control continues with step 318 until the backup battery is fully charged. When the battery is charged, control continues with step 301.

While the preferred embodiment performs control using the master controller 86, control can be distributed amongst various combinations of neurons, shared by the master controller and one or more neurons, or performed by a neuron.

As can be appreciated, the battery reconnect system prevents high transient voltages and in-rush currents when reconnecting batteries that are disconnected to prevent excessive discharge. The battery reconnect system is automated and does not require skilled technicians to perform manual battery reconnection which reduces owning and operating costs and increases up time. Other advantages will be readily apparent to skilled artisans.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A telecommunications power system comprising:
   a battery connection module that is connected to a plurality of batteries;
   a load;
   a rectifier module that is connected to said load, said battery connection module and an alternating current (AC) source;

a contactor that connects said batteries to said load; and a controller that is connected to said contactor, said battery connection module and said rectifier module, wherein said controller opens said contactor when a voltage of said battery falls below a low voltage disconnect threshold and closes said contactor after said AC source returns while minimizing voltage transients and current surge during reconnection.

2. The telecommunications power system of claim 1 wherein before said contactor is closed, said controller lowers a voltage of said rectifier module to said voltage of said battery connection module.

3. The telecommunications power system of claim 2 wherein after said contactor is closed, said controller gradually increases said voltage of said rectifier module to a float voltage of said batteries as said batteries recharge.

4. The telecommunications power system of claim 3 wherein said loads are connected by a distribution module to a power bus.

5. The telecommunications power system of claim 4 wherein said rectifier module includes a first analog to digital (A/D) converter and a first neuron that generates and transmits a rectifier voltage signal to said controller.

6. The telecommunications power system of claim 5 wherein said battery connection module includes a second analog to digital (A/D) converter and a second neuron that generates and transmits a battery voltage signal to said controller.

7. The telecommunications power system of claim 6 wherein said battery connection module senses a contactor voltage across said contactor.

8. The telecommunications power system of claim 7 wherein said second neuron transmits a contactor voltage signal based on said contactor voltage to said controller.

9. The telecommunications power system of claim 8 wherein said controller is connected by a communications bus that employs a serial communications protocol to said first and second neurons.

10. The telecommunications power system of claim 9 wherein said communications bus employs a CAN protocol.

11. A method for providing power to a load in a telecommunication system that includes a battery subsystem with a plurality of batteries, a load, a rectifier module connected to said load, and a contactor that connects said batteries to said load, comprising the steps of:

monitoring voltage that is output by said batteries with a controller;

disconnecting said batteries from said load using said controller when said voltage output by said batteries falls below a low voltage disconnect threshold; and minimizing voltage transients and current surge when reconnecting said batteries to said load using said controller.

12. The method of claim 11 further comprising the step of:
gradually lowering a voltage of said rectifier module to said voltage of said batteries before reconnecting said batteries to said load using said controller.

13. The method of claim 12 further comprising the step of:
gradually increasing said voltage of said rectifier module to said float voltage after said batteries are reconnected to said load using said controller.

14. A telecommunications power system comprising:

a power bus;

a battery module;

a contactor that connects said battery module to said power bus;

a distribution module that is connected to said power bus;

a plurality of loads connected by said distribution module to said power bus;

a plurality of rectifier modules that are connected to said power bus and to a plurality of alternating current (AC) power sources; and a controller that disconnects said battery module using said contactor when a voltage of said battery module falls below a low voltage disconnect when said rectifier modules fail to provide power, wherein said controller minimizes current surge and high voltage transients when said rectifier modules begin to provide power and said controller reconnects said battery module to said load.

15. The telecommunications power system of claim 14 wherein said controller lowers a voltage of said rectifier modules to said voltage of said battery module before said contactor reconnects the battery module.

16. The telecommunications power system of claim 15 wherein said controller gradually increases said voltage of said rectifier modules to said float voltage after said contactor is reconnected to said battery module while charging said battery module.

17. The telecommunications power system of claim 16 wherein said controller is connected to a communications bus.

18. The telecommunications power system of claim 17 wherein said rectifier modules include a first analog to digital (A/D) converter and a first neuron that is connected to said communications bus and that generates and transmits a rectifier voltage signal to said master controller.

19. The telecommunications power system of claim 18 wherein said battery module includes a second analog to digital (A/D) converter and a second neuron that is connected to said communications bus and that generates and transmits a battery module voltage signal to said controller.

20. The telecommunications power system of claim 19 wherein said second A/D converter and said second neuron sense a contactor voltage and transmit a contactor voltage signal to said controller.

* * * * *

UNITED STATES PATENT AND TRADEMARK OFFICE
CERTIFICATE OF CORRECTION

PATENT NO. : 6,885,879 B1
DATED : April 26, 2005
INVENTOR(S) : Pierre Got et al.

It is certified that error appears in the above-identified patent and that said Letters Patent is hereby corrected as shown below:

Column 5,
Line 60, "leas" should be -- leads --.

Signed and Sealed this

Twentieth Day of September, 2005

JON W. DUDAS
*Director of the United States Patent and Trademark Office*